May 21, 1935.  A. ZWALD  2,001,810
ONE-WAY BRAKE
Filed Dec. 1, 1931
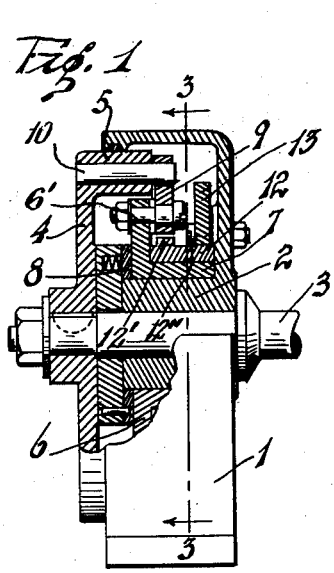
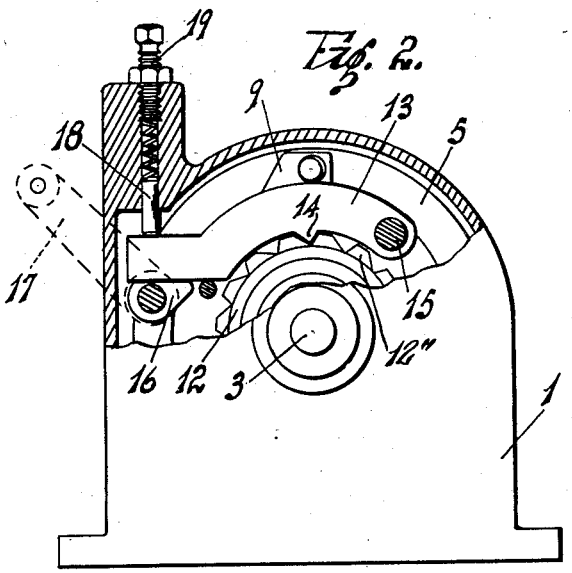
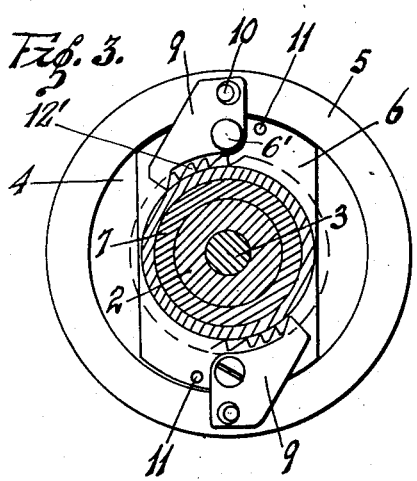
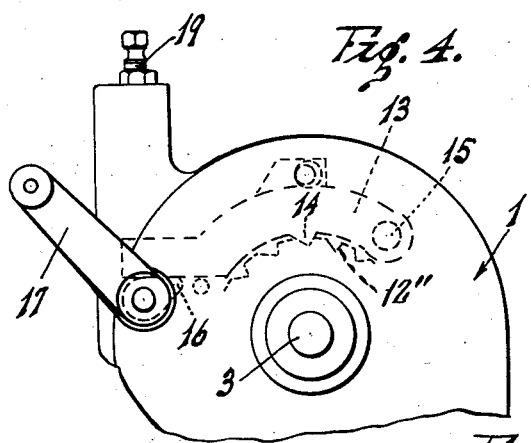
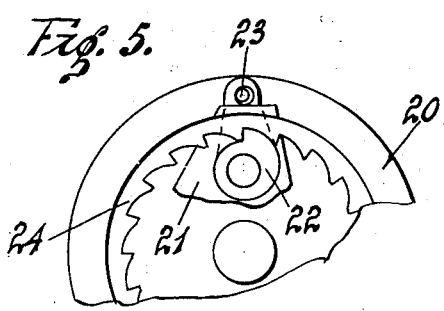
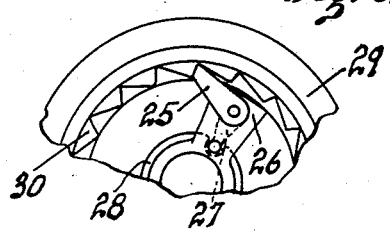
INVENTOR.
ADOLPH ZWALD.
BY
ATTORNEY.

Patented May 21, 1935

2,001,810

UNITED STATES PATENT OFFICE 2,001,810

ONE WAY BRAKE

Adolph Zwald, Torrance, Calif.

Application December 1, 1931, Serial No. 578,299

5 Claims. (Cl. 188—81)

This invention relates to a one way brake of the over running clutch type.

An object of my invention is to provide a ratchet on a one way brake which will positively engage when the movement of the shaft is reversed, and which is entirely free to rotate in the non-engaging direction.

Another object of my invention is to provide a ratchet on a one way brake in which the dogs are raised and do not engage the ratchet teeth when the shaft rotates in the non-engaging direction.

Other objects, advantages and features of invention may appear from the accompanying drawing, the subjoined detailed description and the appended claims.

In the drawing

Figure 1 is a side elevation of my one way brake with parts broken away to show interior construction.

Figure 2 is a front elevation of my brake with parts broken away to show interior construction.

Figure 3 is a sectional view taken on line 3—3 of Figure 1, and with the outer case removed.

Figure 4 is a fragmentary side elevation of my brake.

Figure 5 is a fragmentary side elevation of a modified form of brake.

Figure 6 is a side elevation of a further modified form of brake.

Referring more particularly to the drawing, the numeral 1 indicates a stationary outer case which is formed with an inwardly extending hub 2. A shaft 3 is journaled in the hub 2 and projects through said hub. A disc 4 is secured to the end of the shaft 3 and is rotatably mounted in the case 1.

An inwardly peripheral flange 5 is formed on the disc 4. A drag plate 6 is journaled on the outside of the hub 2 and is formed with a sleeve 7 which is preferably integral therewith. A spring pressed friction plate 8 bears against the rear face of the plate 6 to retard the rotation thereof, the purpose of which will be further described.

A plurality of dogs 9 are pivotally mounted on the drag plate 6 on the pivot pin 6' and are connected at the upper end thereof by a lost motion connection to the flange 5 of the disc 4, that is, a pin 10 extends into a large hole in the dog thus allowing some movement of the pin before the dog is actuated. A stop pin 11 is provided in the drag plate 6 adjacent to the dogs 9 to limit the movement of said dogs.

A ratchet sleeve 12 is journaled on the outside of the sleeve 7, and the ratchet sleeve is provided with two sets of ratchet teeth integrally formed therewith, one set 12' of which is engaged by the dogs 9 and the other set 12 is engaged by a stop lever 13. The stop lever is provided with a single tooth 14 which enters the teeth in the ratchet 12 to hold the ratchet against rotation. The lever 13 is mounted on a pin 15 which projects from the case 1. This lever may be raised out of engagement with the ratchet by means of a cam 16, which cam is rotated by a lever 17. The cam 16 serves to raise the lever sufficiently high so that the tooth 14 escapes the teeth in the ratchet sleeve, and when the lever 17 and cam 16 are returned to operative position, a spring pressed pin 18 in the case returns the lever 13 into engagement with the ratchet sleeve 12.

When the lever 13 is elevated the shaft 3 can rotate freely in either direction, but when the lever 13 is engaged the shaft 3 can rotate freely in only one direction. Under an extreme load, when the dogs 9 are engaged with the ratchet sleeve, the tooth 14 will slip out of engagement with the teeth on the ratchet sleeve due to the inclination of the bearing edge of the tooth. That is, if the load is so great that parts of the ratchet would break, the previously mentioned slip will occur, allowing the tooth 14 to fall into the next notch, but as soon as the load is reduced, the ratchet will again hold. This is merely a safety factor against excess strain. The lever 13 will be raised against tension of the spring pressed pin 18, and the tension of this pin may be varied in any well known manner, such as the cap screw 19.

Referring to Figure 3 and assuming the disc 4 to be rotating in a clockwise direction, the dogs 9 will be swung about the pivot in the drag plate 6 and the teeth on the dogs will be lifted out of engagement with the ratchet sleeve. The dogs will be held out of engagement as long as the disc rotates clockwise, the reason being that the drag plate 6 will lag behind the disc because of the friction plate bearing against it, and also because of the frictional resistance of the sleeve 7 on the hub 2. When the disc reverses its direction the teeth of the dogs 9 will be swung downwardly into engagement with the ratchet sleeve 12, this action occurring because of the lag of the plate 6 behind the disc 4. The shaft 3 may be the rear axle of an automobile and the disc 4 is keyed to it.

In Figure 5 the disc 20 and drag plate 21 are provided as previously described. A dog 22 is rotatably mounted on the drag plate 21, and this dog is connected by a lost motion connection to the disc 20 through a pin 23. An internal gear 24 is mounted on a stationary case or is held stationary in some suitable manner. The engagement and disengagement of the dog is the same as previously described. When the disc 20 and plate 21 rotate counter to their normal rotation, the dog 22 will engage the gear 24 to stop this counter rotation.

In Figure 6 the dog 25 is pivotally mounted on the drag plate 26 and is connected through an arm 27 to the hub 28 of the disc 29. An internal gear 30 engageable by the dog is held stationary on a case or by any suitable means.

The shaft 3 normally rotates in a clockwise direction, as observed in Figure 3, and is driven by a motor, the rear axle of an automobile, or the like. The purpose of my one way brake on an automobile is to prevent the vehicle from rolling backward on a hill, without applying the brakes. The disc 4 is keyed to the shaft 3 and rotates with it. The dogs 9 will be swung by the pivot in the drag plate 6 and the teeth on the dogs will be lifted out of engagement with the ratchet sleeve. The drag plate lags behind the disc 4 and therefore, the loose pin connection 10 can lift the dogs out of engagement with the ratchet sleeve. The dogs will be held out of engagement as long as the disc rotates clockwise. When the disc and the shaft reverse their direction, the teeth of the dogs will be swung downwardly into engagement with the ratchet sleeve because of the lag of the plate 6 behind the disc 4. Thus, the disc and shaft are restrained from moving in reverse direction. In either direction of rotation of the shaft and disc, the plate 6 will lag behind and will, therefore, swing the dogs into or out of engagement with the ratchet sleeve. If the load is so great on the ratchet that parts thereof might break, the tooth 14 in the lever 13 will slip out of engagement with the teeth 12, but will immediately fall into the next adjacent tooth, due to the pressure of the spring pressed pin 18. As soon as the load is reduced, the tooth 14 will remain in position and the ratchet will operate, as previously described.

Having described my invention, I claim:

1. A one way brake comprising a stationary case, a shaft journaled in said case, a disc secured to said shaft, a drag plate journaled in said case, a ratchet sleeve journaled in the case, a plurality of dogs pivotally mounted on said drag plate, means coupling said dogs to said disc, and means releasably securing said ratchet sleeve to the case.

2. A one way brake comprising a stationary case, a shaft journaled in said case, a disc secured to said shaft, a drag plate journaled in said case, a ratchet sleeve journaled in the case, a plurality of dogs pivotally mounted on said drag plate, means coupling said dogs to said disc, and means releasably securing said ratchet sleeve to the case, and friction means engaging said drag plate.

3. A one way brake comprising a stationary case, a hub on the case, a shaft journaled in said hub, a disc secured to said shaft, a drag plate journaled on said hub, a dog pivotally attached to the drag plate, a pin projecting from the disc into said dog, a ratchet sleeve journaled in the case, and means engaging the ratchet sleeve whereby said sleeve is held against rotation.

4. A one way brake comprising a stationary case, a hub on the case, a shaft journaled in said hub, a disc secured to said shaft, a drag plate journaled on said hub, a dog pivotally attached to the drag plate, a pin projecting from the disc into said dog, a ratchet sleeve journaled on said drag plate, a lever mounted on said case, a tooth on the lever, said tooth engaging the ratchet sleeve, and means yieldably holding the lever into engagement with the ratchet sleeve.

5. A one way brake comprising a stationary case, a hub on the case, a shaft journaled in said hub, a disc secured to said shaft, a drag plate journaled on said hub, a dog pivotally attached to the drag plate, a pin projecting from the disc into said dog, a ratchet sleeve journaled in the case, and means engaging the ratchet sleeve whereby said sleeve is held against rotation, and a friction plate engaging said drag plate whereby the rotation of the drag plate is retarded

ADOLPH ZWALD.